United States Patent [19]

Nishio et al.

[11] Patent Number: 5,114,749
[45] Date of Patent: May 19, 1992

[54] METHOD FOR MANUFACTURING CARBON MATERIAL HAVING GOOD RESISTANCE TO OXIDAITON BY COATING THE CARBON MATERIAL WITH AN INORGANIC POLYSILAZANE AND THEN HEATING

[75] Inventors: Hiroaki Nishio; Keiji Watanabe; Michitaka Sato, all of Kawasaki, Japan

[73] Assignee: NKK Corporation, Tokyo, Japan

[21] Appl. No.: 554,697

[22] Filed: Jul. 18, 1990

[30] Foreign Application Priority Data

Aug. 1, 1989 [JP] Japan ................................ 1-197934
Aug. 1, 1989 [JP] Japan ................................ 1-197935

[51] Int. Cl.$^5$ .............................................. B05D 3/02
[52] U.S. Cl. ................................. 427/226; 427/228; 427/296; 427/322; 427/376.2; 427/379; 427/387
[58] Field of Search .................. 427/226, 397.7, 379, 427/322, 294, 296, 228, 387, 376.2

[56] References Cited

U.S. PATENT DOCUMENTS

| | | | |
|---|---|---|---|
| 3,853,567 | 12/1974 | Verbeck | 106/44 |
| 4,678,688 | 7/1987 | Itoh et al. | 427/387 |
| 4,696,827 | 9/1987 | Okamura et al. | 427/36 |
| 4,843,043 | 6/1989 | Nishio | 501/97 |
| 4,935,199 | 6/1990 | Nishio et al. | 419/36 |

FOREIGN PATENT DOCUMENTS 1-167290 6/1989 Japan.

Primary Examiner—Shrive Beck
Assistant Examiner—Benjamin Utech
Attorney, Agent, or Firm—Frishauf, Holtz, Goodman & Woodward

[57] ABSTRACT

A method for manufacturing carbon material having good resistance to oxidation, comprising coating carbon material, which is a sintered body or a porous body, with an inorganic polysilazane; heating the carbon material coated with the inorganic polysilazane in an inert atmosphere to form amorphous silicon nitride on the surface of the carbon material; and reheating the heated carbon material in a non-nitriding and non-oxidizing atmosphere, the amorphous silicon nitride being decomposed and silicon carbide being formed on the surface of the carbon material; the reheating being conducted at a temperature of 1300° C. to 1900° C. and the non-nitriding and non-oxidizing atmosphere having a partial pressure of nitrogen determined with reference to a graph wherein the abscissa is a temperature in °C. and the ordinate is partial pressure of nitrogen in atmospheres, the partial pressure being defined within an area under a line connecting a first point corresponding to 1300° C. and 0.1 atmospheres and a second point corresponding to 1900° C. and 20 atmospheres.

20 Claims, 1 Drawing Sheet

METHOD FOR MANUFACTURING CARBON MATERIAL HAVING GOOD RESISTANCE TO OXIDAITON BY COATING THE CARBON MATERIAL WITH AN INORGANIC POLYSILAZANE AND THEN HEATING

BACKGROUND OF THE INVENTION

1. Field of the Invention

The present invention relates to a method for manufacturing carbon having good resistance to oxidation.

2. Description of the Prior Art

Great hopes are set on carbon material as a high-temperature material since the strength of carbon material is not lowered at a high temperature of 1000° C. or more, and the carbon material has a high heat conductivity.

However, when a temperature of air exceeds 500° C., the carbon material in the air becomes unfit for use since it is oxidized and becomes unfit for use. Therefore, as a method for preventing the oxidation of the carbon material at a high temperature, a method, wherein the carbon material is used in an inert atmosphere, or a method, wherein the carbon material can be used in the atmosphere of high temperature by forming an oxide protective coating on the surface of the carbon material by the use of a chemical deposition method, is known. There is also known a method wherein a surface layer of the carbon material is converted to silicon carbide by reacting the surface layer of the carbon material with silicon monoxide gas at a high temperature. Sintered carbon coated with silicon carbide is widely used for a crucible for withdrawing a single silicon crystal or a susceptor for epitaxial growth or the like in the fields related to semiconductors.

Carbon materials of a porous body having heat resistance and resistance to oxidation are also industrially useful material. Great hopes are placed on a porous carbon body as a porous board for surface combustion, or a heat transfer element releasing heat, which is obtained by means of convective heat or transfer, by means of heat transfer by radiation, or a filter for dust containing gas of high temperature. For this purpose, a high porosity of 40 to 80 vol. % is required. In this case, it is clear that only the surface coating of the porous carbon body is not sufficient. The carbon material for those porous bodies and the prior art methods for coating the porous bodies will now be described.

The carbon material for the porous body is usually manufactured from carbon fiber as a material. The carbon fiber is used in the form of a long fiber of 3 to 20 $\mu$m in diameter or in the form of a short fiber obtained by cutting the carbon fiber so that a ratio of the diameter of the short fiber to the length thereof can be from 3 to 50. In the case of the long fiber, a preform obtained by weaving the long fiber in two dimensions or three dimensions is prepared. In the case of the short fiber, a preform is prepared by the use of a shape-keeping property of the short fibers which are entwined with each other.

It is known that since the strength of such preform is small and the resistance to oxidation of the preform at a high temperature is bad, the surfaces of fibers are coated with silicon carbide for the purpose of connecting the fibers with each other and imparting resistance to oxidation to the fibers. The following method is disclosed, for example, in a Japanese Patent Publication Laid Open No. 167290/89:

A high molecular organic silicon compound is impregnated into a preform. The high molecular organic compound is converted to silicon carbide by subjecting the high molecular organic compound to a heat treatment. A coating of silicon carbide or silicon nitride is formed on the surface of silicon carbide by means of a chemical vapor phase deposition method. In the case of coating the preform with silicon carbide, polycarbosilane, polysilostyrene or the like, which is converted to silicon carbide by means of a heat treatment at a temperature of 1000° to 1600° C., is used as a high molecular organic chemical compound of silicon, with which the first layer of the preform is coated. A mixed gas of methyltrichlorosilane, hydrogen and argon is used as a material for silicon carbide, with which the second layer is coated, and those gases are reacted with each other at a temperature of 1000° to 1650° C. In the case of the layer of silicon nitride, a mixed gas of silicon tetrachloride, ammonia, hydrogen and argon is used. In this way, a porous body having not only heat resistance, but also resistance to oxidation can be obtained.

Subsequently, the problems of the prior art methods for manufacturing carbon material having good resistance to oxidation, mainly the problems of the coats in the prior art methods will now be described.

In the foregoing chemical deposition method, since silicon carbide forms layers on the surface of the sintered carbon body or the carbon material of the porous body, silicon carbide insufficiently adheres to the surface of the sintered carbon body or the carbon material. Moreover, since there is a difference in the thermal expansion coefficients between silicon carbide and the sintered carbon body or the carbon material, the base carbon material can be oxidated or impaired by flaking or cracking of coating layers due to repeated heating and cooling. In a conversion method, coating layers of good adhesiveness can be obtained, but this method requires a high temperature of 1700° C. or more, which causes a problem of equipment and operation. Further, a problem of the source of silicon which is supplied in the form of gas is posed as a problem common to the chemical deposition method and the conversion method.

SUMMARY OF THE INVENTION

It is an object of the present invention to manufacture carbon material having good resistance to oxidation.

To attain the above-mentioned object, the present invention provides a method for manufacturing carbon material having good resistance to oxidation, comprising the steps of:

coating carbon material with an inorganic polysilazane;

heating said carbon material coated with the inorganic polysilazane in an inert atmosphere, amorphous silicon nitride being formed on the surface of said carbon material; and reheating said heated carbon material in a non-nitriding and non-oxidizing atmosphere, silicon carbide being formed on the surface of said carbon material.

The above objects and other objects and advantages of the present invention will become apparent from the detailed description which follows, taken in conjunction with the appended drawings.

DESCRIPTION OF THE PREFERRED EMBODIMENT

Figure 1:
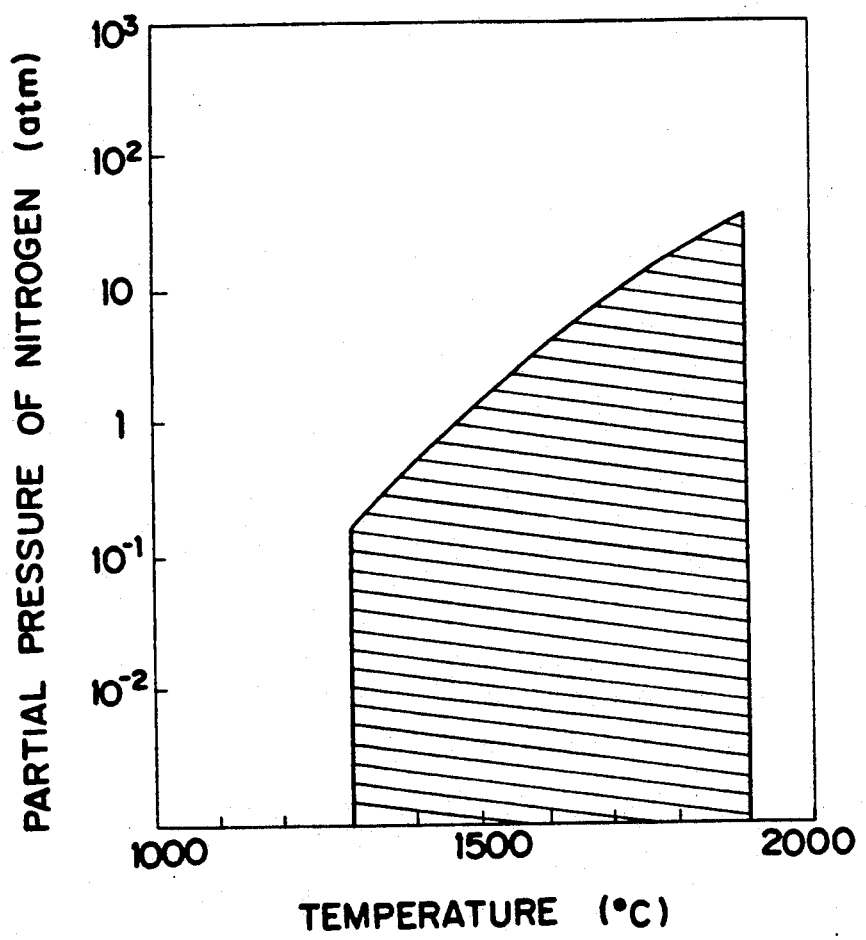
FIG. 1 is a graphical representation showing the relationship between a partial pressure of nitrogen and a heating temperature which can accomplish the non-nitriding atmosphere according to the present invention.

The present inventors made a great effort to attain the aforementioned object. As a result, the present inventors have found that a strong coat high in resistance to oxidation can be formed on the surface of the carbon material by coating the carbon material with inorganic polysilazane, heating the carbon material in a non-nitriding and non-oxidizing atmosphere, and forming layers of silicon carbide on the surface of the carbon material, and have completed the present invention.

The shape of the carbon material is determined depending on the use of the carbon material and is specifically not limited. To clean the carbon material and to improve wettability of the carbon material, the carbon material can be washed by an organic solvent such as dichloromethane or the like and coated with inorganic polysilazane.

The sintered carbon body is obtained by forming, sintering and graphitizing material such as natural graphite, artificial graphite, carbon black, coke pitch, carbon fibers or the like. Carbides such as TiC, ZrC, NbC, or $B_4C$ or boride such as $TiB_2$, or $ZrB_2$ can be added to the carbon material as a sintering assistant. Further, the density of the carbon material can be increased by impregnating pitch into the carbon material after sintering of the carbon material and by making a carbonation sintering of the carbon material.

It is good if the density of said sintered body is high. The apparent density of the sintered body is desired to be 1.6 g/cm$^3$ or more. It is understood that, when the density of the sintered body is below 1.6 g/cm$^3$, the surface shape of the sintered body becomes complicated, when it is examined with a microscope. In consequence, it is difficult to completely coat the surface of the sintered body with silicon carbide and to seal off the base carbon material from the atmospheric gas.

The porous carbon body can be a textile woven by long fiber in two dimensions or three dimensions or a compact formed by using the shape-keeping property of short fibers entwined with each other. When a sufficient shape-keeping property of the short fibers cannot be obtained, an organic or inorganic binder can be added to the compact of the short fibers as a forming auxiliary. The carbon fibers can be of either PAN (polyacrylonitrile) group or of pitch group. The diameter of the fibers is specifically not limited, but desired to be from 3 to 20 $\mu$m.

In the case of the carbon fiber, it is clear that since the peripheries of fine fibers are exposed to the atmosphere, the fibers deteriorate more susceptibly under the influence of the atmosphere than a block-shaped sintered body. In this connection, the diameter of the fibers is desired to be larger. There is, however, the lowest limit, which is determined by the decrease of strength of the porous body in connection with the deterioration of the coat and by an expected service life of products. As a result of tests, the aforementioned lowest limit was estimated at 3 $\mu$m.

On the other hand, when the diameter of the fibers is over 20 $\mu$m, the area of the surfaces, on which the fibers contact each other, is small. Therefore, the connection of the fibers with each other by means of silicon carbide is insufficient, by which only a porous body having a low strength is obtained. The strength of the carbon porous body can be enhanced by increasing the packing density of the fibers. In this case, however, the porosity of the porous body is lowered, by which the function of the porous body is impaired.

In the case of the short fibers, the ratio of the diameter of the fiber to the length thereof is preferred to be 3 to 50. When the ratio is below 3, only a low porosity is obtained. When the ratio is over 50, the fibers are liable to be converted to lumps, being entwined with each other, before forming of the fibers. Therefore, it is difficult to form a compact having pores of a uniform diameter.

Inorganic polysilazane is an elastomer obtained by diluting chlorosilane $H_{4-a}SiCl_a$ (a=1, 2, 3, 4) in a solvent and reacting it with ammonia ($NH_3$). In the method of the present invention, inorganic polysilazane can be produced by using $H_2SiCl_2$ as a material or by using a mixture of heterogeneous chlorosilane with $H_2SiCl_2$ as a main component. Inorganic polysilazane in the state of a liquid at ordinary temperatures is favorable. For example, polysilazane having structures such as $[H_2SiNH]_x$, or $[H_2SiNH]_x \cdot (H_2Si)_{1.5}N]_y$ is used. Such inorganic polysilazane can be used as it is as a coating liquid. Inorganic polysilazane can be used as a coating liquid by diluting it with a solvent. Benzene, diethylether, dichloromethane, tetrahydrofuran, pyridine or the like is used as the solvent. The structures, compositions and molecular weight of inorganic polysilazane synthesized vary somewhat depending on the sorts of the solvents. However, although any of them is used, inorganic polysilazane consists of hydrogen, nitrogen and silicon, and does not contain carbon.

The degree of dilution of chlorosilane in the solution is affected by the ease of permeation of chlorosilane into the carbon material and by the thickness of the liquid layers formed on the surface of the carbon material. Therefore, the this degree is unconditionally not determined. However, the concentration of 1 to 80 wt. % of the solution is regarded as appropriate by experience. When the concentration of the solution exceeds 80 wt. %, dried layers of inorganic polysilazane becomes thin, by which the base material are liable to be exposed. The thickness of the dried layers of around 40 to 200 $\mu$m is appropriate.

In the case of the thickness of the dried layers of less than 40 $\mu$m, when inorganic polysilazane is converted to silicon carbide, being heated, the thickness of silicon carbide is insufficient and cannot obtain a predetermined resistance to oxidation. When the thickness of the dried layers exceeds 200 $\mu$m, the dried layers of said silicon carbide become breakable, by which the layers can separate from the base material.

The entire surface of the sintered carbon body can be coated with inorganic polysilazane, or only a portion of the sintered carbon body, which is liable to be oxidized, being exposed during the use of the sintered carbon body, can be coated. The method for coating, wherein the sintered carbon body is coated with the aforementioned coating liquid, is specifically not limited. The coating liquid can be applied by a brush, or immersion of the sintered carbon body into the coating liquid or the like. When the sintered carbon body is previously degassed, immersed into the coating liquid, and the sintered carbon body immersed into the coating liquid is pressurized, the coating liquid permeates well into the pores of the sintered carbon body, by which a good coat without exposure of the base material can be obtained.

In the case of the porous carbon body manufactured from the carbon fiber, the aforementioned coating liquid can be made to permeate into the porous carbon body under pressure. The coating liquid can be made to suck into the pores of the porous carbon body, which are kept vacuous. The method for sucking the coating liquid into the pores of the porous carbon body is favorable since the coating liquid can be made to sufficiently permeate into the small pores formed in the porous body, where the carbon fibers contact each other, by keeping a high pressure for a predetermined period of time after the sucking of the coating liquid.

The applied pressure of 5 to 5000 kg/cm$^2$ is appropriate. When the pressure is below 5 kg/cm$^2$, the coating liquid does not permeate sufficiently into among the surfaces of the fibers. When the pressure is 5000 kg/cm$^2$, the coating liquid permeates sufficiently not only into among the surfaces of the fibers, but also into the pores of the fibers. The higher the pressure, the better the permeation of the coating liquid. However, when the pressure is increased to more than 5000 kg/cm$^2$, it is difficult to obtain a pressure apparatus, which increases equipment cost.

The treatment carried out after the carbon material have been coated with the aforementioned coating liquid will now be described.

The carbon material coated with the coating liquid is heated in an inert atmosphere by the use of a heating furnace which can regulate the atmosphere. Initially, the solvent is evaporated. Then, polysilazane begins to be decomposed by heat at a temperature of around 150° C. The heat decomposition of polysilazane terminates substantially at a temperature of around 600° C., and amorphous silicon nitride can be obtained. The aforementioned inert atmosphere can be obtained by charging helium, neon or argon into the heating furnace.

After the coating liquid has been decomposed by heat and amorphous silicon nitride has been obtained, the heat treatment is applied to the carbon material in an inert atmosphere at a high temperature. In this case, the aforementioned heating furnace can be used as it is. However, since the heating temperature is high and it takes much time for the heat treatment, another furnace is often desired to be used as the sintering furnace.

The aforementioned inert atmosphere is a non-nitriding and non-oxidizing atmosphere. Said non-nitriding atmosphere means an atmosphere having a sufficiently low partial pressure of nitrogen. Nitrogen gas is released when amorphous silicon nitride, to which inorganic polysilazane has converted, reacts with carbon as a base material and generates silicon carbide. Nitrogen gas is not prevented from being released in an atmosphere having a sufficiently low partial pressure of nitrogen. The partial pressure of nitrogen is 0.1 atm. at 1300° C. and 20 atm at 1900° C., and the partial pressure of nitrogen is desired to be kept within the range shown with oblique lines in FIG. 1. FIG. 1 is a graphical representation showing the relationship between the partial pressure of nitrogen and the heating temperature.

The non-oxidizing atmosphere is in the atmosphere wherein oxide gas such as oxygen, moisture or the like are substantially not contained in said atmosphere, and the generation of silicon monoxide can be ignored at a heating step, at which the layers of silicon carbide are formed.

Inert gas such as helium, neon and argon or hydrogen gas is desired as the atmospheric gas which forms the non-nitriding and non-oxidizing atmosphere during the heating. The pressure of around $10^{-4}$ to 100 atm. is appropriate. The heating temperature of 1300° to 1900° C. in the non-nitriding and non-oxidizing atmosphere is appropriate. When the heating temperature is below 1300° C., the reaction rate is small, which is not put to practical use. When the heating temperature exceeds 1900° C., the phenomenon such that silicon as silicon monoxide gas is vaporized by a very small amount of oxygen inevitably mixed into the atmosphere cannot be ignored. Therefore, the loss of silicon increases.

The time of the heating can be a time enough to form the layers of silicon carbide. The time of the heating can be around 5 to 20 hours at 1300° C., and 0.5 to 5 hours at 1900° C.

According to the present invention, the layers are formed on the surface of the carbon material by liquid inorganic polysilazane, carbon on the surface of the carbon material is converted to silicon carbide by the reaction of said polysilazane with carbon in the base carbon material, and layers of silicon carbide with good adhesiveness can be effectively formed. According to the aforementioned method, in addition to the heat resistance which carbon has originally, the carbon material having the resistance to oxidation at a high temperature can be manufactured.

EXAMPLE 1

A sintered isotropic graphite body of 2.01 gr/cm$^3$ in apparent density of 50 mm in breadth, 50 mm in length and 10 mm in thickness was immersed into dichloromethane and left as it is for 24 hours. Thereafter, it was taken out and dried. This sintered body was put into a vessel of silicon rubber. The vessel with the sintered body therein was evacuated to $10^{-2}$ Torr. Inorganic liquid polysilazane was introduced into said rubber vessel, and the sintered body was immersed into the liquid inorganic polysilazane. The pressure inside the vessel was increased to the atmospheric pressure. A lid of silicon rubber was attached to said rubber vessel and said rubber vessel was sealed. A pressure of 5000 kg/cm$^2$ was applied on the vessel from the outside of the vessel by the use of a cold static hydraulic press. Thereafter, the treated sintered body was taken out of the vessel. The treated sintered body was put into a heating furnace and heated therein. The temperature inside the heating furnace was raised to 600° C. at a rate of 10° C./min. The sintered body was kept as it was in the heating furnace for one hour and naturally cooled. Successively, the sintered body was put into a sintering furnace. The temperature inside the sintering furnace was elevated to 1500° C. in an atmosphere of argon at room temperature at a rate of 30° C./min. 5 hours later, the sintered body was naturally cooled. For a test, when this sintered body was kept in the atmosphere at 1200° C. for 100 hours, it was found that the weight of the sintered body increased by only 2.2 wt. %, but there was no change except for the increase of the weight.

EXAMPLE 2

A coating liquid of 50 wt. % inorganic polysilazane and 50 wt. % dichloromethane was regulated, and the same operation as that in the Example 1 was carried out for the sintered isotropic graphite body of 50 mm in breadth, 50 mm in length and 10 mm in thickness. It was found in the above-mentioned test that the weight of the sintered body increased by 0.20 wt. %. Except for the increase of the weight of the sintered body, there was no change.

EXAMPLE 3

Long fibers of 7 μm in diameter of PAN group were woven in two dimensions and stacked in layers, by which a sheet of 2.8 mm in thickness, 100 mm square and 0.72 g/cm$^3$ in apparent density was obtained. This sheet was immersed into dichloromethane and kept as it was for 24 hours. Then, this sheet was taken out of dichloromethane and dried. The sheet was degassed to $10^{-2}$ Torr in a vacuum in the vessel of silicon rubber. Liquid inorganic polysilazane as the coating liquid was introduced into said rubber vessel, into which the sheet was immersed. Said rubber vessel was sealed by a cover of silicon rubber. After a pressure of 5000 kg/cm$^2$ had been applied from the outside of the vessel on the vessel, the sheet treated was taken out of the vessel, by which an impregnant was obtained. The impregnant was put into the heating furnace, and heated up to 600° C. at a rate of 10° C./min. The impregnant was kept as it was for one hour. Thereafter, it was naturally cooled. Successively, the impregnant was put into the sintered furnace, and heated up to 1500° C. in an atmosphere of argon of the atmospheric pressure. 5 hours later, the impregnated body was taken out of the sintering furnace and naturally cooled, by which a porous body was obtained. This porous body has the apparent density of 0.89 g/cm$^3$. Although the porous body was kept as it was for 100 hours in the atmosphere at 1200° C. for a test, the weight of the porous body increased by only 0.31 wt. %.

EXAMPLE 4

Short fibers of 7 μm in diameter of PAN group were dispersed in dichloromethane by the use of supersonic waves so that the content of the short fibers in dichloromethane can be 5 vol. %. Immediately, dichloromethane with the short fibers dispersed therein was cast into a die. A porous disk of resin of 30 mm in diameter, which has a communicating pores of 50 to 200 μm was inserted into the die. Dichloromethane was pressed out by the use of a ram through the porous disk by pressing dichloromethane from above at a pressure of 200 kg/cm$^2$. Dichloromethane was taken out and dried, by which a preform of 3 mm in thickness and 30 mm in diameter was obtained. The apparent density of the preform was 0.81 g/cm$^3$. On the other hand, the coating liquid was regulated by dissolving 80 wt. % liquid inorganic polysilazane into 20 wt. % dichloromethane.

The aforementioned preform was put into the vessel of silicon rubber. The pressure inside the vessel was reduced to $10^{-2}$ Torr. The foregoing coating liquid was impregnated into the preform by introducing the coating liquid into the aforementioned rubber vessel. Subsequently, said rubber vessel was sealed with a cover of silicon rubber. A pressure of 5000 kg/cm$^2$ was applied from the outside of the vessel on the vessel, and the preform treated was taken out of the vessel, by which an impregnant was obtained. The impregnated body was heated in the heating furnace. The heating temperature was elevated up to 100° C. at a rate of 10° C./min. The impregnated body was kept as it was for one hour. The heating temperature was again elevated up to 600° C. The impregnated body was kept as it was for one hour. Thereafter, the impregnated body was taken out of the heating furnace and cooled naturally. Successively, the impregnated body was put into the sintering furnace and heated. The heating temperature was elevated up to 1500° C. at a rate of 30° C. in an atmosphere of argon of the atmospheric pressure, and 5 hours later, the impregnated body was naturally cooled, by which a sintered porous body was obtained. This sintered body has an apparent density of 1.02 g/cm$^3$. Although the sintered body was kept as it was for 100 hours in the atmosphere at 1200° C. for the test, the weight of the sintered body increased by only 0.25 wt. %.

What is claimed is:

1. A method for manufacturing carbon material having good resistance to oxidation, comprising the steps of:
    coating carbon material with an inorganic polysilazane;
    heating said carbon material coated with said inorganic polysilazane in an inert atmosphere to form amorphous silicon nitride on the surface of said carbon material; and
    reheating said heated carbon material in a non-nitriding and non-oxidizing atmosphere, the amorphous silicon nitride being decomposed and silicon carbide being formed on the surface of said carbon material, said reheating being conducted at a temperature of 1300° C. to 1900° C. and said non-nitriding and non-oxidizing atmosphere having a partial pressure of nitrogen determined with reference to a graph wherein the abscissa is temperature in °C. and the ordinate is partial pressure of nitrogen in atmospheres, said partial pressure being defined within an area under a line connecting a first point corresponding to 1300° C. and 0.1 atmospheres and a second point corresponding to 1900° C. and 20 atmospheres.

2. The method of claim 1, wherein said carbon material is a sintered body which is made of at least one material selected from the group consisting of artificial graphite, carbon black, coke pitch and carbon fiber.

3. The method of claim 2, wherein said sintered body has an apparent density of 1.6 g/cm$^3$ or more.

4. The method of claim 1, wherein said carbon material is a porous body which is made of carbon fiber.

5. The method of claim 4, wherein said carbon fiber has a diameter of 3 to 20 μm.

6. The method of claim 4, wherein said porous body is a porous body made of long carbon fibers of a length of 50 mm to 100 mm.

7. The method of claim 4, wherein said porous body is a porous body made of short carbon fibers of, wherein said carbon fibers have a ratio of diameter to length of from 3 to 50 and the diameter of the fibers is 3 to 20 μm.

8. The method of claim 1, which further comprises the step of cleaning the carbon material with an organic solvent, the surface of the carbon material then being coated with inorganic polysilazane.

9. The method of claim 8, wherein said solvent is dichloromethane.

10. The method of claim 8, wherein said inorganic polysilazane includes an inorganic polysilazane in the state of a liquid at normal temperature and an inorganic polysilazane diluted by a solvent.

11. The method of claim 10, wherein said solvent is one selected from the group consisting of benzene, diethylether, dichloromethane, tetrahydrofuran and pyridine.

12. The method of claim 1, which further comprises the step of impregnating inorganic polysilazane into said carbon, said carbon being coated with said inorganic polysilazane.

13. The method of claim 12, wherein said carbon material is a porous body.

14. The method of claim 1, wherein said carbon material is heated to 300° to 600° C. in an atmosphere of an inert gas selected from the group consisting of helium, neon, argon and hydrogen gas.

15. The method of claim 14, wherein the carbon material is reheated in an atmosphere of an inert gas selected from the group consisting of helium, neon, argon and hydrogen, said inert gas is at a pressure of $10^{-4}$ to 100 atmospheres and the reheating is conducted for a period of 0.5 to 20 hours.

16. The method of claim 1, wherein said carbon material is reheated in an atmosphere of an inert gas selected from the group consisting of helium, neon, argon and hydrogen gas, said inert gas is at a pressure of from $10^{-4}$ to 100 atm.

17. The method of claim 16, wherein said carbon material is reheated for 0.5 to 20 hours at a temperature of 1300° C. or is reheated for 0.5 to 5 hours at a temperature of 1900° C.

18. A method for manufacturing carbon material having good resistance to oxidation, comprising the steps of:
   cleaning a carbon material with an organic solvent;
   degassing the cleaned carbon material in a flexible vessel under a vacuum;
   introducing a liquid of inorganic polysilazane into said vessel;
   applying a pressure on said vessel from outside;
   heating carbon material taken out of said vessel to 300° to 600° C. in an inert atmosphere to form amorphous silicon nitride on the surface of the carbon material; and
   reheating said heated carbon material to 1300° to 1900° C. in a non-nitriding and non-oxidizing atmosphere, the amorphous silicon nitride being decomposed and silicon carbide being formed on the surface of said carbon material.

19. The method of claim 18, wherein the carbon material is a sintered body having an apparent density of 1.6 g/cm$^3$ or more and made of at least one material selected from the group consisting of artificial graphite, carbon black, coke pitch and a carbon fiber having a diameter of 3 to 20 μm and a ratio of diameter to length of 3 to 50; the heating at 300° to 600° C. is conducted in an atmosphere of an inert gas selected from the group consisting of helium, neon, argon and hydrogen gas; the reheating at 1300° to 1600° C. is conducted in an atmosphere of an inert gas selected from the group consisting of helium, neon, argon and hydrogen, said insert gas is at a pressure of $10^{-4}$ to 100 atmospheres and said reheating being conducted for a period of 0.5 to 20 hours.

20. The method of claim 18, wherein said reheating is conducted at a temperature of 1300° C. to 1900° C. and said non-nitriding and non-oxidizing atmosphere having a partial pressure of nitrogen determined with reference to a graph wherein the abscissa is temperature in °C. and the ordinate is partial pressure of nitrogen in atmospheres, said partial pressure being defined within an area under a line connecting a first point corresponding to 1300° C. and 0.1 atmospheres and a second point corresponding to 1900° C. and 20 atmospheres.

* * * * *